United States Patent
Rose et al.

(10) Patent No.: US 8,696,450 B2
(45) Date of Patent: Apr. 15, 2014

(54) METHODS FOR ANALYZING AND PROVIDING FEEDBACK FOR IMPROVED POWER GENERATION IN A GOLF SWING

(75) Inventors: Jessica Rose, Palo Alto, CA (US); David W. Meister, Milwaukee, WI (US); Amy L. Ladd, Palo Alto, CA (US); Katherine M. Steele, Chicago, IL (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/559,800

(22) Filed: Jul. 27, 2012

(65) Prior Publication Data

US 2013/0029791 A1 Jan. 31, 2013

Related U.S. Application Data

(60) Provisional application No. 61/512,264, filed on Jul. 27, 2011.

(51) Int. Cl.
*A63F 9/24* (2006.01)

(52) U.S. Cl.
USPC ............................................. 463/30; 473/407

(58) Field of Classification Search
USPC ............ 463/31, 30, 43; 341/20; 473/209, 409
See application file for complete search history.

(56) References Cited

U.S. PATENT DOCUMENTS

| | | | | |
|---|---|---|---|---|
| 5,419,562 A * | 5/1995 | Cromarty | ...................... | 473/269 |
| 5,486,001 A * | 1/1996 | Baker | .......................... | 473/266 |
| 5,762,565 A * | 6/1998 | Milam et al. | .................. | 473/271 |
| 6,402,635 B1 * | 6/2002 | Nesbit et al. | .................. | 473/269 |
| 6,476,812 B1 * | 11/2002 | Yoshigahara et al. | ........ | 345/427 |
| 6,991,556 B2 * | 1/2006 | LaTerra | ........................ | 473/274 |
| 7,264,554 B2 | 9/2007 | Bentley | | |
| 7,494,430 B2 * | 2/2009 | Choi | ............................. | 473/407 |
| 7,804,998 B2 | 9/2010 | Mundermann et al. | | |
| 7,931,604 B2 | 4/2011 | EvenZohar et al. | | |
| 7,946,928 B2 * | 5/2011 | Mooney | ........................ | 473/269 |
| 8,019,137 B2 | 9/2011 | Sullivan et al. | | |
| 8,207,963 B2 | 6/2012 | Cotter et al. | | |
| 2006/0166737 A1 | 7/2006 | Bentley | | |
| 2006/0252018 A1 | 11/2006 | Sooch | | |
| 2010/0267462 A1 | 10/2010 | Mooney | | |
| 2011/0046915 A1 | 2/2011 | Hol et al. | | |
| 2011/0249095 A1 | 10/2011 | Kim et al. | | |
| 2011/0249865 A1 | 10/2011 | Lee et al. | | |
| 2011/0260890 A1 | 10/2011 | Larsen et al. | | |
| 2012/0052972 A1 | 3/2012 | Bentley | | |
| 2012/0122574 A1 | 5/2012 | Fitzpatrick | | |
| 2012/0143358 A1 | 6/2012 | Adams et al. | | |
| 2012/0163675 A1 | 6/2012 | Joo et al. | | |

OTHER PUBLICATIONS

Burden, et al., J. of Sports Medicine and Physical Fitness, 7(2):76-82 (1998).

Grimshaw and Burden, Medicine and Science in Sports and Exercise, 32(1):1617-73 (2000).

(Continued)

*Primary Examiner* — Masud Ahmed
(74) *Attorney, Agent, or Firm* — Convergent Law Group LLP (57) ABSTRACT

This invention relates to methods for optimizing a golf swing by measuring and providing feedback on a combination of various key parameters of a subject's movement to both generate more power and reduce injury.

20 Claims, 8 Drawing Sheets

(56) References Cited

OTHER PUBLICATIONS

Lemak, et al., Science and Golf II: Proceedings of the World Scientific Congress of Golf, pp. 14-19 (1994).
Lephart, et al., J. of Strength and Conditioning Research, 21(3):860-69 (2007).
McLean, Golf, 34(12):28 (1992.
McTeigue, et al., Science and Golf II: Proceedings of the World Scientific Congress of Golf, pp. 50-58 (1994.
Zheng, et al., International J. of Sports Medicine, 29(6):487-93 (2008).

* cited by examiner

METHODS FOR ANALYZING AND PROVIDING FEEDBACK FOR IMPROVED POWER GENERATION IN A GOLF SWING

CROSS REFERENCE TO RELATED APPLICATIONS

This application claims priority to U.S. Ser. No. 61/512,264, filed Jul. 27, 2011.

FIELD OF THE INVENTION

This invention relates to methods for optimizing a golf swing by measuring and providing feedback on various key parameters of a subject's movement.

BACKGROUND OF THE INVENTION

In the following discussion, certain articles and methods will be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

Golf swing power generation is a primary determinant of driving distance and can be estimated using clubhead speed at impact (CSI). However, achieving the very high club head speeds typical of professional swings requires a surprisingly complex set of activities that appear not to be properly understood by golfers or coaches. There appears to be a general belief among players, coaches and other professionals that the individual player's golf swing is beyond scientific evaluation and only can be effectively analyzed and improved by human observation; however, professionals and coaches are beginning to embrace quantitative analysis in addition to visual analysis.

With this in mind, rotational biomechanics have been identified as a key element influencing power generation, though analysis of professional golf performance has previously focused on events that occur at specific time points. No analysis to date has identified a combination of key parameters and benchmark curves that can be assessed simultaneously and that demonstrate elite golf performance throughout the duration of the swing and in relation to phases of the golf swing.

Thus, there is a desire in the field to define benchmark parameters that can be used to assess a user's movement during a golf swing to allow focused feedback as to how the user can modify his or her swing to generate more power and reduce injury. The present invention addresses this need.

SUMMARY OF THE INVENTION

This Summary is provided to introduce a selection of concepts in a simplified form that are further described below in the Detailed Description, and is not intended to identify key or essential features of the claimed subject matter, nor is it intended to be used to limit the scope of the claimed subject matter. Other features, details, utilities, and advantages of the claimed subject matter will be apparent from the following written Detailed Description including those aspects illustrated in the accompanying drawings and defined in the appended claims.

The present invention provides a method for analyzing a golf swing, comprising: measuring movement of a subject performing a golf swing; and calculating values for at least four of the following parameters: peak X-factor, X-factor at impact, peak S-factor, S-factor at impact, peak O-factor and O-factor at impact. In some aspects of the invention, at least five of the parameters are measured, and in some aspects, all six of the parameters are measured.

In some aspects of this first embodiment of the invention, values are calculated for at least one of the following additional parameters: clubhead speed at impact, clubhead height, upper torso rotation at impact, upper torso rotational velocity at impact, pelvic rotation at impact, pelvic rotational velocity at impact, peak free moment/mass, peak upper torso rotation, peak upper torso rotational velocity, peak pelvic rotation, and peak pelvic rotational velocity; and in some aspects of the invention, values are calculated for at least two, three, four, five, six, seven, eight, or nine of the additional parameters, and in some aspects, values are calculated for all the listed additional parameters.

Yet another embodiment of the present invention provides a method for analyzing and improving a subject's golf swing comprising: measuring movement of a subject performing a golf swing; calculating values for at least four of the following parameters: peak X-factor, X-factor at impact, peak S-factor, S-factor at impact, peak O-factor and O-factor at impact; and comparing the values of the measured parameters to target values for these parameters. In some aspects of the invention, at least five of the parameters are measured, and in some aspects, all six of the parameters are measured.

In some aspects of this second embodiment of the invention, values are calculated for at least one of the following additional parameters: clubhead speed at impact, clubhead height, upper torso rotation at impact, upper torso rotational velocity at impact, pelvic rotation at impact, pelvic rotational velocity at impact, peak free moment/mass, peak upper torso rotation, peak upper torso rotational velocity, peak pelvic rotation, and peak pelvic rotational velocity; and in some aspects of the invention, values are calculated for at least two, three, four, five, six, seven, eight, or nine of the additional parameters, and in some aspects, values are calculated for all the listed additional parameters.

Yet another embodiment of the invention provides a method for analyzing and improving a subject's golf swing comprising: measuring movement of a subject performing a golf swing; calculating values for the following parameters: peak X-factor, X-factor at impact, peak S-factor, S-factor at impact, peak O-factor and O-factor at impact, clubhead speed at impact, peak free moment/mass, peak upper torso rotation, peak upper torso rotational velocity and peak pelvic rotation; and comparing the values of the measured parameters to target values for these parameters.

Yet other embodiments and aspects of the invention are described in the Detailed Description below.

DETAILED DESCRIPTION OF THE INVENTION

The practice of the techniques described herein may employ, unless otherwise indicated, conventional techniques and descriptions of biomechanics, physiology, electrophysiology, physical conditioning, data analysis, or signal processing, all of which are within the skill of those who practice in the art. Specific illustrations of suitable techniques can be had by reference to the Examples herein; however, other equivalent conventional procedures can, of course, also be used. Such conventional techniques and descriptions can be found in standard manuals and texts such as Winter, *Biomechanics and motor control of human movement*, Fourth Ed., 2009 (John Wiley & Sons); Mow et al., *Basic orthopaedic biomechanics & mechano-biology*, Third Ed., 2005 (Lippincott Williams & Wilkins); Kenney, et al., Hay, *Biomechanics of Sports Techniques*, Fourth Ed., 1993 (Benjamin Cummings); Menache, *Understanding Motion Capture for Computer Animation*, 2d Ed. (Morgan Kaufmann 2010), Kitagawa and Windsor, *MoCap for Artists: Workflow and Techniques for Motion Capture* (Focal Press 2008); Tobon and Restrepo, *The Mocap Book: A Practical Guide to the Art of Motion Capture* (Foris Force 2010); Elgammal, et al., *Human Motion—Understanding, Modeling, Capture and Animation: Second Workshop on Human Motion*, Rio de Janeiro, Brazil (Springer 2007); Kamel and Camilho, *Image Analysis and Recognition: Second Int'l Conference*, ICIAR, Toronto, Calif. (Springer 2005), all of which are herein incorporated in their entirety by reference for all purposes. Additionally, all articles and other art cited herein are incorporated in their entirety by reference for all purposes.

Note that as used herein and in the appended claims, the singular forms "a," "an," and "the" include plural referents unless the context clearly dictates otherwise. Thus, for example, reference to "a parameter for evaluating a golf swing" refers to one or more parameters for evaluating a golf swing, and reference to "measuring" or "analyzing" includes reference to equivalent steps and methods known to those skilled in the art, and so forth.

Unless defined otherwise, all technical and scientific terms used herein have the same meaning as commonly understood by one of ordinary skill in the art to which this invention belongs. All publications mentioned herein are incorporated by reference for the purpose of describing and disclosing devices, formulations and methodologies that may be used in connection with the presently described invention.

Where a range of values is provided, it is understood that each intervening value, between the upper and lower limit of that range and any intervening value in that stated range is encompassed within the invention. The upper and lower limits of these smaller ranges may independently be included in the smaller ranges, and are also encompassed within the invention subject to any specifically excluded limit in the stated range. Where the stated range includes one or both of the limits, ranges excluding either both of those included limits are also included in the invention.

In the following description, numerous specific details are set forth to provide a more thorough understanding of the present invention. However, it will be apparent to one of skill in the art that the present invention may be practiced without one or more of these specific details. In other instances, features and procedures well known to those skilled in the art have not been described in order to avoid obscuring the invention.

The present invention relates to methods for optimizing a golf swing by measuring and providing feedback on a combination of various key parameters of a subject's movement to both generate more power and reduce injury. Several key parameters have been identified that are highly consistent among professional golfers, and the present invention provides methods for optimizing a golf swing comprising measuring and assessing these parameters for a subject and providing feedback that can be utilized for training so that the subject can match the target values for these key parameters. Key parameters include:

X-factor (the relative difference between the rotation of the hips and the shoulders, calculated in some embodiments as the angle between a line defined by the right and left anterior superior iliac spines (i.e., pelvis) and a line defined by the right and left acromion processes (i.e., upper torso) projected into the horizontal plane), peak X-factor, and X-factor at impact;

S-factor (the obliquity or tilt of the shoulders in relation to the horizontal, calculated in some embodiments as the angle between a 3-dimensional line defined by the right and left acromion processes and the horizontal plane), peak S-factor, and S-factor at impact;

O-factor (the pelvic obliquity or tilt of the hips in relation to the horizontal, calculated in some embodiments as the angle between a 3-dimensional line defined by the right and left anterior superior iliac spines and the horizontal plane), peak O-factor, and O-factor at impact;

upper torso rotation (relative to the ground, calculated in some embodiments as the angle between a line defined by the right and left acromion prosses and the fore-aft direction of the lab), peak upper torso rotation, and upper torso rotation at impact;

upper torso rotational velocity (calculated in some embodiments as the derivative with respect to time of the upper torso rotation angle and filtered to remove high frequency noise), peak upper torso rotational velocity, and upper torso rotational velocity at impact;

pelvic rotation (relative to the ground, calculated in some embodiments as the angle between a line defined by the right and left anterior superior iliac spines and the for-aft direction of the lab), peak pelvic rotation, and pelvic rotation at impact;

pelvic rotational velocity (calculated in some embodiments as the derivative with respect to time of the pelvic rotation angle and filtered to remove high frequency noise), peak pelvic rotational velocity, and pelvic rotational velocity at impact;

normalized free moment (torque, measured in some embodiments as the ground reaction moment in the vertical axis (vector along the z-axis, extending from the floor to the ceiling) about the subject's center of pressure with both feet on a force plate; free moment was divided by body mass in order to normalize for subject size), and peak free moment;

clubhead speed at impact; and clubhead height.

In embodiments of the invention, a subject's movements while performing a golf swing are measured or detected by a system or apparatus, the measurements are used to provide values for a plurality of parameters, and the parameters are analyzed and compared to target values for these parameters. There are various methods known in the art that can be used to measure body and club movements associated with a golf swing. The most successful and commonly used methods of this type are motion capture systems.

Generally, current motion analysis systems require that the subject wear sensor elements on their body and the sensor elements transmit positional data of isolated body parts, such as hands, hips, shoulders and head. The isolated points on the body are measured during a swing in accordance with an absolute reference system, e.g., a Cartesian coordinate system wherein the center point is a fixed point in the room. By using motion analysis, exact measurements are provided from which values for a plurality of parameters are calculated and from which an evaluator can more accurately determine problems in a subject's swing.

Motion tracking or motion capture in some embodiments is a photogrammetric analysis tool where a subject wears markers near each joint to identify the motion by the positions or angles between the markers. Acoustic, inertial, LED, magnetic or reflective markers, or combinations of these, are tracked, optimally at least two times the frequency rate of the desired motion, to submillimeter positions. The resolution of the system is important in both the spatial resolution and temporal resolution as motion blur causes almost the same problems as low resolution. Optical systems utilize data captured from image sensors to triangulate the three-dimensional position of a subject between one or more cameras calibrated to provide overlapping projections. Data acquisition is traditionally implemented using special markers attached to the subject; however, more recent systems are able to generate accurate data by tracking surface features identified dynamically for each particular subject. Such systems typically produce data with three degrees of freedom for each marker, and rotational information must be inferred from the relative orientation of three or more markers; for instance shoulder, elbow and wrist markers providing the angle of the elbow. Newer hybrid systems are combining inertial sensors with optical sensors to reduce occlusion and improve the ability to track without having to manually clean up data.

Inertial motion capture technology is based on miniature inertial sensors, biomechanical models and sensor fusion algorithms. The motion data of the inertial sensors (inertial guidance system) is often transmitted wirelessly to a computer, where the motion is recorded or viewed. Most inertial systems use gyroscopes to measure rotational rates. Much like optical markers, the more gyros the more natural the data. No external cameras, emitters or markers are needed for relative motions, although they are required to give the absolute position of the subject if desired. Inertial mocap systems capture the full six degrees of freedom body motion of a human in real-time and can give limited direction information if they include a magnetic bearing sensor, although these are much lower resolution and susceptible to electromagnetic noise. Benefits of using inertial systems include: no solving, portability, and large capture areas. Disadvantages include 'floating' where the subject looks like a marionette, and lower positional accuracy and positional drift which can compound over time. These systems are similar to the Wii® controllers but are more sensitive and have greater resolution and update rates and can accurately measure the direction to the ground to within a degree.

Mechanical motion capture systems directly track body joint angles and are often referred to as exo-skeleton motion capture systems, due to the way the sensors are attached to the body. The subject attaches the skeletal-like structure to his or her body and as he moves so do the articulated mechanical parts, measuring the subject's relative motion. Mechanical motion capture systems typically are real-time, relatively low-cost, free-of-occlusion, and wireless (untethered) systems that have unlimited capture volume. Typically, they are rigid structures of jointed, straight metal or plastic rods linked together with potentiometers that articulate at the joints of the body. Some suits provide limited force feedback or Haptic input.

Magnetic systems calculate position and orientation by the relative magnetic flux of three orthogonal coils on both the transmitter and each receiver. The relative intensity of the voltage or current of the three coils allows these systems to calculate both range and orientation by meticulously mapping the tracking volume. The sensor output is six degrees of freedom, which provides useful results obtained with two-thirds the number of markers required in optical systems; e.g., one on upper arm and one on lower arm for elbow position and angle. The markers are not occluded by nonmetallic objects but are susceptible to magnetic and electrical interference from metal objects in the environment, like rebar (steel reinforcing bars in concrete) or wiring, which affect the magnetic field, and electrical sources such as monitors, lights, cables and computers. The sensor response is nonlinear, especially toward edges of the capture area. The wiring from the sensors tends to preclude extreme performance movements. The capture volumes for magnetic systems are dramatically smaller than they are for optical systems.

In addition to body movement measurements, forces may be measured as well. One way to do so involves use of an appropriately programmed computer to model forces within the body, by ascribing masses and moments of inertia to the body segments and club and using body and club motions measured by the motion capture system to drive the joints and segments of the model. The computer analyzes the motion and determines the relevant forces and work. Although not normally associated with body segment measurement, information related to body movement and forces also can be obtained from measured ground-reaction forces. There are various devices known in the prior art which measure ground-reaction forces, including insole pressure pads, standing mat pressure pads and single or double rigid standing platforms, sometimes referred to as force plates. Pressure pads typically comprise a matrix of a large number of miniature force/pressure sensors.

Force plates typically comprise rigid rectangular platforms with force sensors positioned under the corner regions. They are commonly used to analyze balance and gait in medical or sports applications and were utilized in the methods herein to measure free moment. The sensors are usually of the strain gauge, piezoelectric, capacitance or piezoresistive types. Force plates typically comprise one or two platforms. Where two platforms are used, the subject places one foot on each. Force plates typically measure either vertical forces, or forces in all three XYZ directions in three-dimensional space, that is vertical and side forces.

The principle components of one embodiment of a measurement system for use in the present invention comprises inertial sensors, attached to a subject's body, which communicate by wireless means with a base transceiver that is part of a computer-based motion analysis system that includes a control and display capability, such as a laptop computer, with suitable application software and an onboard or connected database. Other sensory devices, at least one and typically several video cameras and optionally a microphone and other sensors, are connected to system by wire or wireless means. The system processes motion data and generates, displays and/or transmits reports and/or feedback and also may provide prescriptions as described in more detail below. Training tools may or may not be directly linked to the motion analysis system or the other associated components, but may be used by the evaluator or subject during practice exercises as prescribed by the system after testing and analysis.

There are a number of systems known in the art with some systems specifically adapted to measuring parameters associated with golf swings, including but not limited to those systems disclosed in USSNs 2012/0163675; 2012/0143358; 2012/0122574; 2012/0052972; 2011/0260890; 2011/0249865; 2011/0249095; 2011/0046915; 2012/0267462; 2006/0166737; 2006/0252018; and U.S. Pat. Nos. 8,207,963; 8,019,137; 7,931,604; and 7,804,998, all of which are incorporated herein in the entirety for all purposes.

As described in the context of motion capture systems, above, devices used in measuring the movements that are used to calculate values for the various parameters include sensors placed on desired parts of the body segments, in the environment, on the floor, or placed on different interfaces or objects. These sensors include but are not limited to reflective or illuminated markers, gyroscopes to measure angular velocity; accelerometers to measure inclination or linear acceleration; magnetometers to measure magnetic field strength or direction; electrodes to measure changes in electrical potential, muscle activation, or heart rate; pressure, force, or torque sensors to measure kinetic interaction between body parts and interfaces; cameras coupled with or without markers to measure position of body segments or objects; force platform systems to measure ground reaction forces and moments; goniometers to measure joint angles; speed sensors to measure speed; and temperature sensors to measure body parts or ambient heat. These sensors optionally are connected to one processor or to a network of processors that acquires the movement data during the testing session by sampling and storing the signal from the sensors at predefined sampling frequency.

Data acquired by the sensors and stored in a memory during the subject's movement is processed to obtain values for specific descriptive parameters, such as, for example, pelvic and shoulder tilt, rotation velocity of the pelvis and upper torso, the relative difference between the rotation of the hips and the shoulders, free moment, position of the head, medial-lateral velocity of the subject's center of mass, etc. Measurement in most embodiments uses a "comparison model" to compare the values of the parameters obtained from a subject to target values for these parameters to provide guidance on how the subject can alter his or her technique to increase performance and/or reduce the risk for injury. Thus, the comparison model comprises comparing the subject's actual movement (described by a set of discrete parameters) with target (reference) parameters.

Analysis of the data acquired typically involves both standard and custom algorithms. These algorithms include but are not limited to altering the measurement units; calibrating the signals to account for the location of the sensors on the body segments, on the golf club, golf ball, or in the environment; smoothing or filtering the signals; analyzing and combining the signals to obtain the specific descriptive parameters; extracting discrete metrics from the descriptive parameters; comparing the subject's movement (described by a set of discrete parameters) with target parameters using a comparison model to evaluate the performance or the risk of injury and, optionally, to provide data on how the subject can improve his or her technique.

A first step in analysis is to conduct calibration routines for each sensor to obtain signals in the proper units. The units of the signals from the sensors are converted from the measured units (like volt) to the desired measurement units (like degree per second, or g-force) using predefined calibration equations. The signals are the modified based on the individual placement of the sensors and conditions of the testing session. Calibration procedures are customized to the specific types of sensors being used as well as the location of the sensors on the body segments, on the objects, or in the testing environment. For example, calibration routines for an accelerometer attached to a body segment identify the position and orientation of the sensors relative to the segment. Additionally, in some cases, the sensors are adjusted based on the initial conditions of the testing session (initial position, orientation, temperature, etc). The data may be filtered or smoothed using either standard signal processing filters (Butterworth filters, Gaussian filters, etc.) or custom designed filters specific to the application.

Once the data is in the proper units and adjusted, a customized analysis of the movement is completed, which depends on the type of sensors used and the movement analyzed. In general, the signals are processed to obtain values for the key parameters, critical temporal features of the movement are then identified (for example, the beginning of backswing, initial downswing, mid-downswing, late downswing, ball impact, end of follow-through, etc.), and discrete metrics are determined either as values of the descriptive parameters at those critical time points or statistical reduction of the parameters between time points. If a desired parameter is not measured directly, the data from the sensors is manipulated to produce the desired parameter; for example, position may be the desired descriptive parameter but velocity is actually measured, therefore velocity is integrated to calculate position. The sensor data may also be combined to reduce the error of measurement using methods such as Kalman filtering; for example, position data calculated from velocity may be enhanced using occasional position data to correct for drift in the non-ideal velocity sensor.

Once data is acquired and analyzed through movement measurement and value calculation for the parameters, feedback is provided to an evaluator and/or directly to the subject. Feedback may be provided in any number of ways, for example, various graphical displays may be used to provide feedback. For example, feedback may be provided by displaying the outputs of the comparison model in chart or graph form, as shown in FIGS. 2A and 2B and FIGS. 3A through 3G, on a monitor or other display. The charts or graphs may display not only the most recent variables, but a series of variables taken over time, as well as target parameters, and the like. Alternatively or in addition, the graphical display may include images of the subject (or an avatar) performing the movement, with superimposed visual indicators showing optimal movement accomplishment. In some embodiments, the display may use perspective techniques to display a three-dimensional animation such that body movements can be seen from different points of view in a three-dimensional space. Furthermore, the graphical display may include videos of other subjects performing ideal or non-ideal golf swings with explanations and/or comparisons to the current subject's movement. In addition, information such as text or a cartoon might be provided. The graphical display may be on a computer monitor, a TV, a smartphone, provided by a projector, or other type of display platform. Similar visual methods to the methods presented in this paragraph are used to communicate the results of the risk or performance evaluation to the subject.

In addition to using graphical displays, feedback may also be provided to the subject by way of audio signals, such as bells, beeps, buzzers, chimes, alarms, a synthetic voice giving instructions, or other suitable sounds. In some embodiments, the sounds audible to the subject can be descriptive: one sound (e.g., a clicking sound, a buzz, a beep of one tonality) can indicate that a movement has been performed inappropriately; another sound (e.g., a swoosh sound, a pleasant chord, or a beep of a different tonality) can indicate that the movement has been performed appropriately. In some embodiments, the pitch, intensity, and/or frequency of the sound can change to provide information about how much the subject's movement and/or position varies from a certain value or range of values or to provide other information to the subject. Audio feedback may be provided from feedback devices located on the subject's body or separated from the body.

A number of techniques for sonifying golf swing data have been described by Kleiman-Weiner and Berger (*A Model for Multidimensional Auditory Display of Physical Motion*, Poster session presented at the 12th International Conference on Auditory Display, London, UK; 2006). In one technique, recorded golf swing data was used to generate synthetic vowel sounds. Club head velocity and X-factor each controlled the frequency of one vocal formant, and X-factor also controlled left-to-right stereo panning. Human vowel sounds are known to be readily recognizable and reproducible and therefore serve as useful feedback and an effective way to sonify or map sound from data. Preliminary studies have shown that identification of golf swing rotational biomechanics were more discernable to participants who were given audio-based feedback compared those using visual observation of video, demonstrating that vowel sound sonification may offer a valuable training modality for real-time identification of golf swing biomechanics essential to power generation (see, Sheppard, A. et al., Gonzalez, D., Schoenfeld, S., Dahl, L., Rose, J., "Sonification of Golf Swing Rotational Biomechanics: A comparison of audio versus visual feedback", presented at Conference for Biomechanics, (2010)).

Other sensory cues can be used as an alternative to or in addition to graphical or auditory signals. For example, feedback mechanisms may comprise haptic devices that provide vibrations, forces, or pressure that can be detected by the subject. The feedback may include one or more vibration devices placed on the body of the subject that can indicate if the movement has been performed appropriately; the type and strength of the vibration can also be used to provide information to the subject. Alternatively or additionally, this feedback might include resistive or constructive forces to the subject's body to indicate the desired ideal movements or to prevent the subject from moving in a non-ideal manner. These resistive or constructive forces may be produced by a variety of actuators, and may be controlled by a variety of control mechanisms. The feedback may also be pressure actuators that apply pressure to the body to indicate how the subject should conduct the movement. These pressure actuators may also vary in location and intensity based on the desired feedback necessary for the subject.

EXAMPLES

Example 1

Subjects and Protocol

Ten professional and five amateurs (one low-handicap collegiate (handicap 4), one medium handicap (handicap 15), one high-handicap (handicap 30), and two novices (handicap unknown; they do not play regularly)) right-handed male golfers were tested in the Motion & Gait Analysis Laboratory at Lucile Packard Children's Hospital (Stanford University, Palo Alto, Calif.). Professional and amateur golfers were similar in age (31.0±5.9 years vs. 28.4±6.9 years), height (1.83±0.07 m vs. 1.78±0.03 m), and weight (85.9±11.5 kg vs. 77.3±8.9 kg). The study was approved by the Institutional Review Board, Stanford University and consent was obtained from participants. Forty-two reflective markers were placed on the subjects' bodies, using a combination of the Helen Hayes Marker set and an upper body marker set (Aguinaldo, et al., J. of Applied Biomechanics, 23(1):42-51 (2007); Kadaba, et al., J. of Orthopedic Res., 8(3):383-92 (1990)). Three markers were also placed on the participant's golf club (proximal, middle, and distal shaft), (proximal, middle, and distal shaft), and a plastic practice ball was wrapped in light-reflective tape and placed on a synthetic grass mat. Each subject performed three swings of different efforts (easy, medium, and hard) using his personal 5-iron club. Kinematic data were collected using an eight-camera optometric system for three-dimensional motion analysis (Motion Analysis Corporation, Santa Rosa, Calif.) at a sampling rate of 240 Hz. The average 3-D residual error for the motion capture system was 1.2±0.6 mm, which was the degree of accuracy in which the system could reconstruct the location of each marker in the capture volume. Ground reaction force and free moment data were collected using a 40 cm×60 cm multi-component, six degrees-of-freedom force plate (Bertec Corporation, Columbus, Ohio) at a sampling rate of 2400 Hz. The kinetic data was simultaneously recorded as an analogue input channel into the EVaRT system (Motion Analysis Corporation, Santa Rosa, Calif.).

Figure 1:
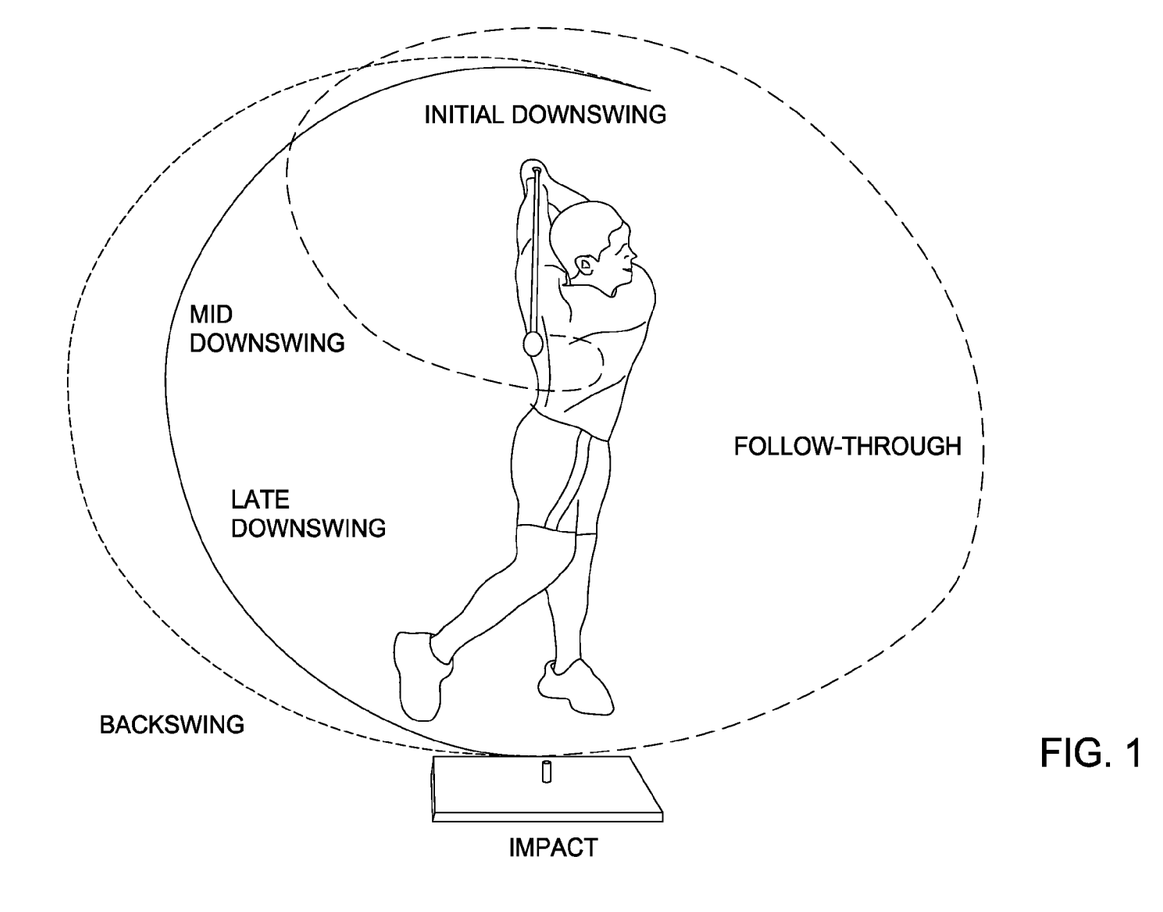
FIG. 1 is an illustration showing the primary phases of the golf swing as determined by clubhead position.

For each professional golfer, the two best trials with minimal marker drop-out were processed. For amateur golfers, the two best trials of the hard swings were analyzed. Data from the markers located on the body were filtered using a Butterworth filter with a cutoff frequency of 12 Hz. Data from markers on the ball and clubhead were not smoothed. Golfers performed the swings in a non-randomized order from easy to hard, and were given verbal cues prior to each swing. The interpretation of what constituted an easy, medium, and hard swing was left to the discretion of the golfer. Golf swings were analyzed using in-house algorithms written in Excel 2002 (Microsoft Corporation, Redmond, Wash.). Swing phases were defined based on clubhead and ball kinematics. The rising clubhead initiated backswing when velocity in the vertical direction exceeded 0.2 m/s (FIG. 1). The initiation of downswing was defined by the transition of the clubhead direction at the top of backswing. Impact was defined as the time point immediately preceding the initial increase in ball velocity.

The algorithms utilized golf swing data files to calculate pelvic and upper torso rotation angles with respect to the intended line of flight and projected into the horizontal plane, peak X-factor during the golf swing, X-factor at impact, O-factor (pelvic obliquity), S-factor (shoulder obliquity), peak ground reaction free moment, peak clubhead speed, and CSI. The X-factor was calculated as the angle between a line defined by the right and left anterior superior iliac spines (i.e., pelvis) and a line defined by the right and left acromion processes (i.e., upper torso) projected into the horizontal plane. This method is standard with many prior studies (Adlington, Clinics in Sports Medicine, 15(1):9-26 (1996); Burden, et al., J. of Sports Medicine and Physical Fitness, 7(2):76-82 (1998); Grimshaw and Burden, Medicine and Science in Sports and Exercise, 32(1):1617-73 (2000); Lemak, et al., Science and Golf II: Proceedings of the World Scientific Congress of Golf, pp. 14-19 (19940; Lephart, et al., J. of Strength and Conditioning Research, 21(3):860-69 (2007); McLean, Golf, 34(12):28 (1992); McLean and Andrisani, The X-Factor Swing, Harper Collins (1997); McTeigue, et al., Science and Golf II: Proceedings of the World Scientific Congress of Golf, pp. 50-58 (1994); Zheng, et al., International J. of Sports Medicine, 29(6):487-93 (2008). The O-factor was calculated as the angle between a 3-dimensional line defined by the right and left anterior superior iliac spines and the horizontal plane. The S-factor was calculated as the angle between a 3-dimensional line defined by the right and left acromion processes and the horizontal plane. Clubhead speed at impact was calculated using the linear three-dimensional velocity of the reflective marker placed on the most distal point of the club shaft at the time point immediately preceding impact. The free moment was measured as the ground reaction moment in the vertical axis (vector along the z-axis, extending from the floor to the ceiling) about the subject's center of pressure with both feet, in athletic shoes, on the force plate. Free moment was divided by body mass in order to normalize for subject size due to the influence of mass on frictional forces which contributed to the ground reaction free moment.

Example 2

Benchmark Curves and Statistical Analysis

Biomechanical factors of the professional golfers' hard swings were averaged first within subjects, then between subjects in order to generate mean±S.D. normal curves. Each swing was normalized to a golf cycle phase from the beginning of backswing (0%) to ball impact (100%). The end of follow-through (140%) was defined by the local minimum of vertical clubhead displacement after the club swung around the body during follow-through. Amateur swings were graphed over the professional normal curves for comparison. Swing cycle normalizations and curves were generated using in-house algorithms written in MATLAB (The MathWorks, Natick, Mass.).

Statistical analyses of the professional golf swing data were performed using SPSS v15.0 (SPSS Inc., Chicago, Ill.). Mean values of biomechanical parameters within each level of effort were calculated for comparison between easy, medium, and hard swings among subjects. Coefficients of variation were computed as the ratio of the standard deviation to the mean for easy, medium, and hard swings. Significant increases from easy to medium to hard swings were analyzed using non-parametric related samples Friedman ranks tests ($\alpha=0.05$). Individual differences between easy and hard, easy and medium, and medium and hard swings were analyzed using non-parametric related samples Wilcoxon signed ranks tests ($\alpha=0.05$). Correlations were computed within subjects between peak X-factor and CSI, X-factor at impact and CSI, peak free moment/kg and CSI, peak pelvic rotation and CSI, peak upper torso rotation and CSI, peak S-factor and CSI, S-factor at impact and CSI, peak O-factor and CSI, and O-factor at impact and CSI using non-parametric two-tailed Spearman correlations ($\alpha=0.05$). Where appropriate, data are reported as mean±1 S.D.

Example 3

Analysis

Figure 2A:
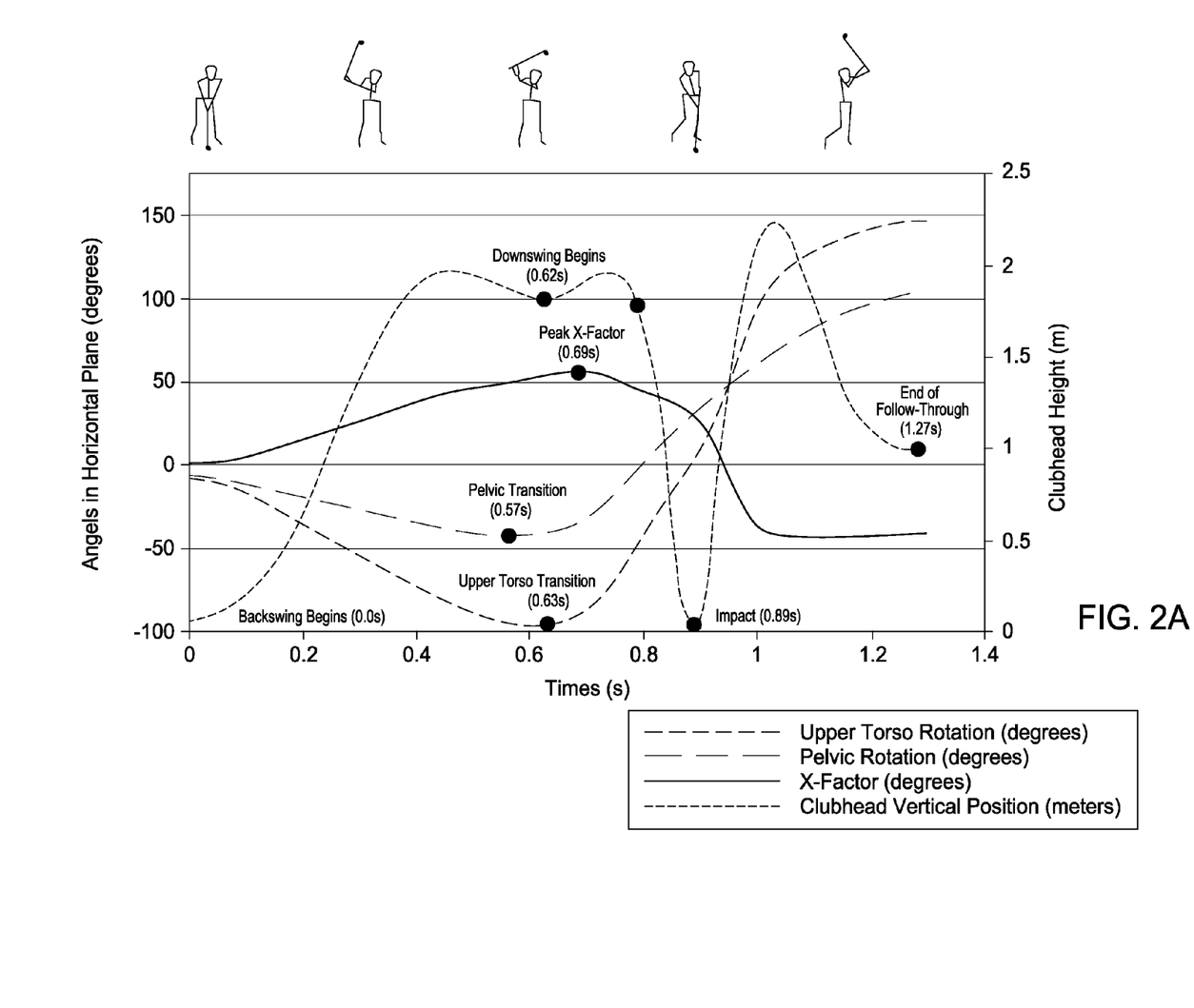
FIGS. 2A and 2B show the sequence of key biomechanical events during a representative hard golf swing.
Figure 2B:
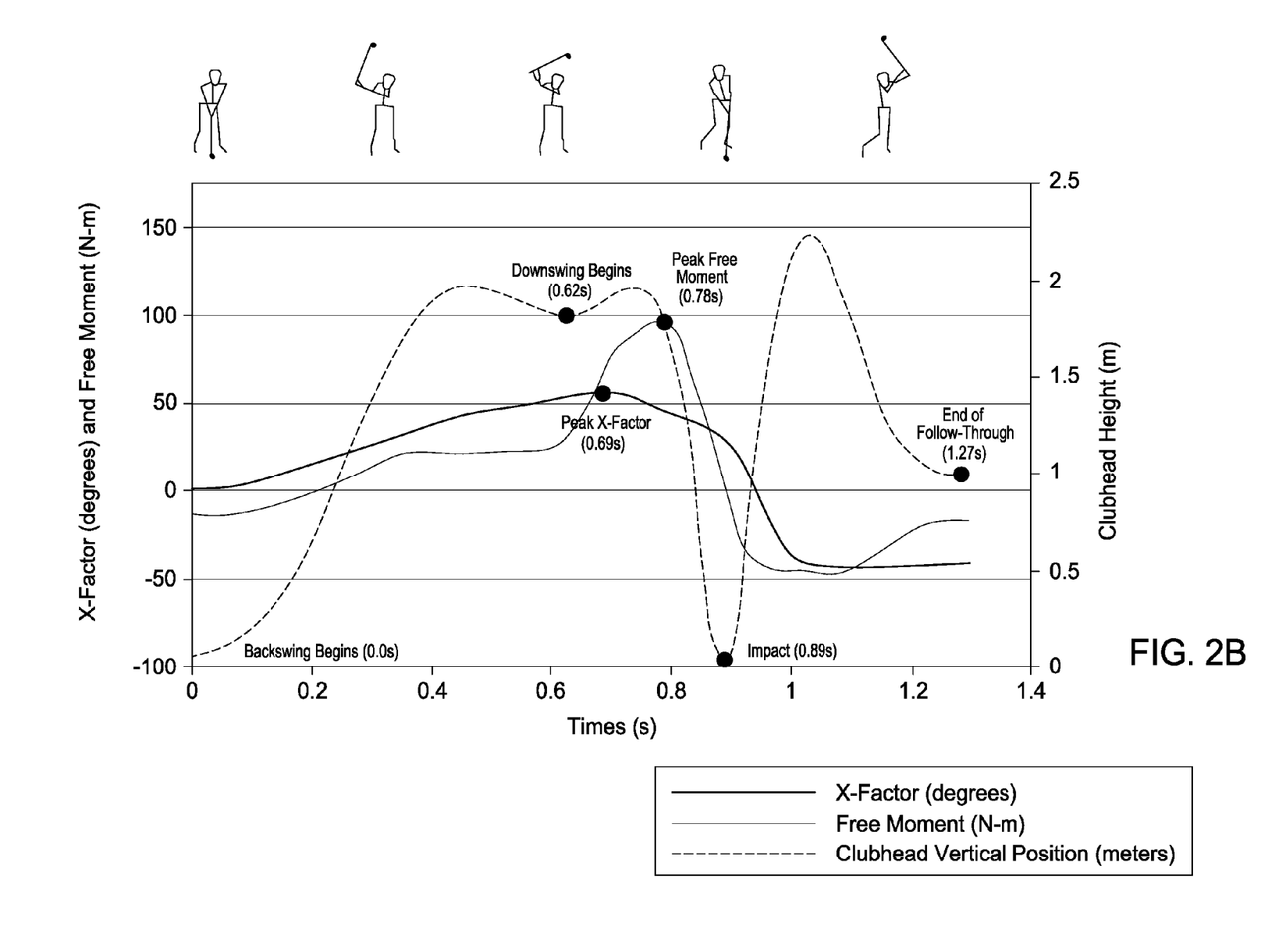
Figure 3A:
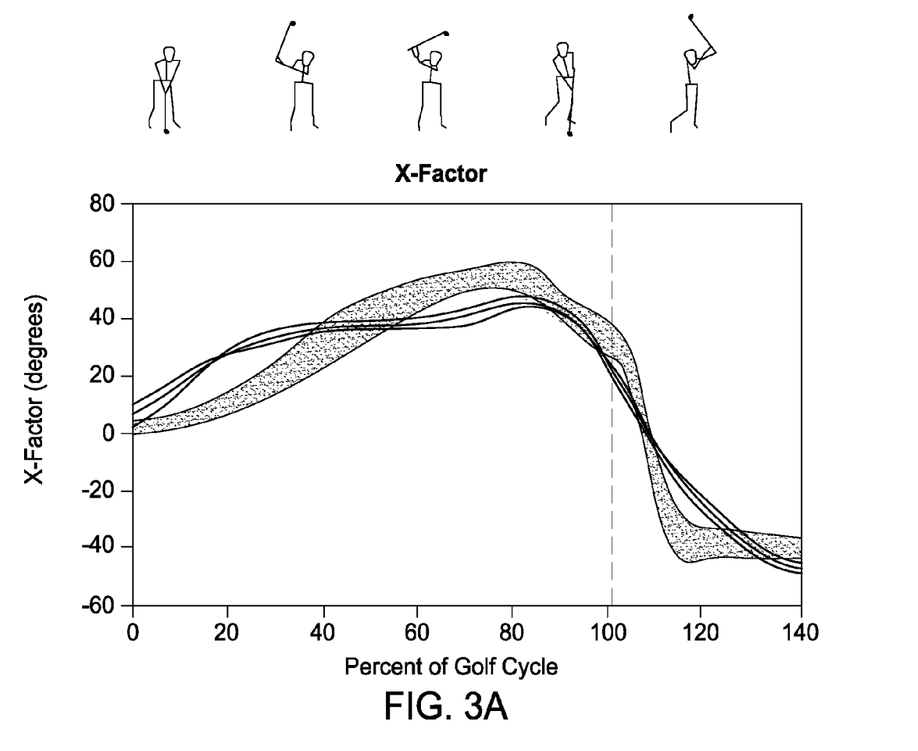
FIGS. 3A through 3I show a series of graphs of benchmark curves of rotational biomechanics for hard golf swings of one amateur (with a handicap of 15, shown as three solid lines) compared to professionals (shaded curve).
Figure 3B:
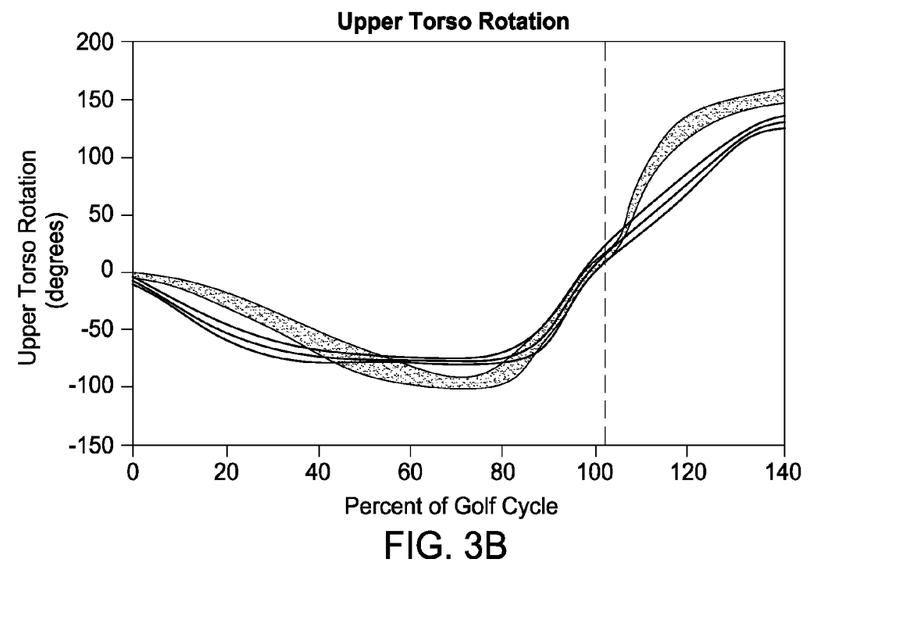
Figure 3C:
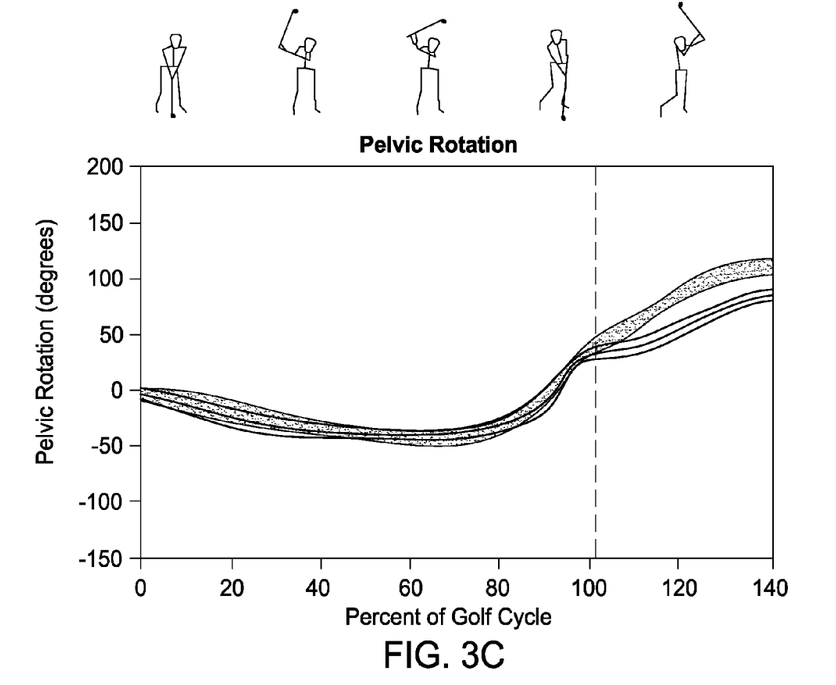
Figure 3D:
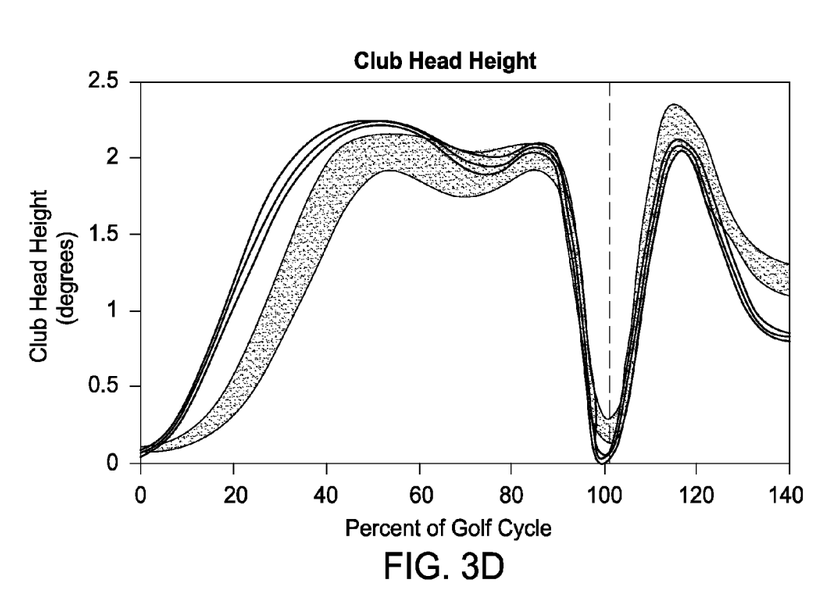
Figure 3E:
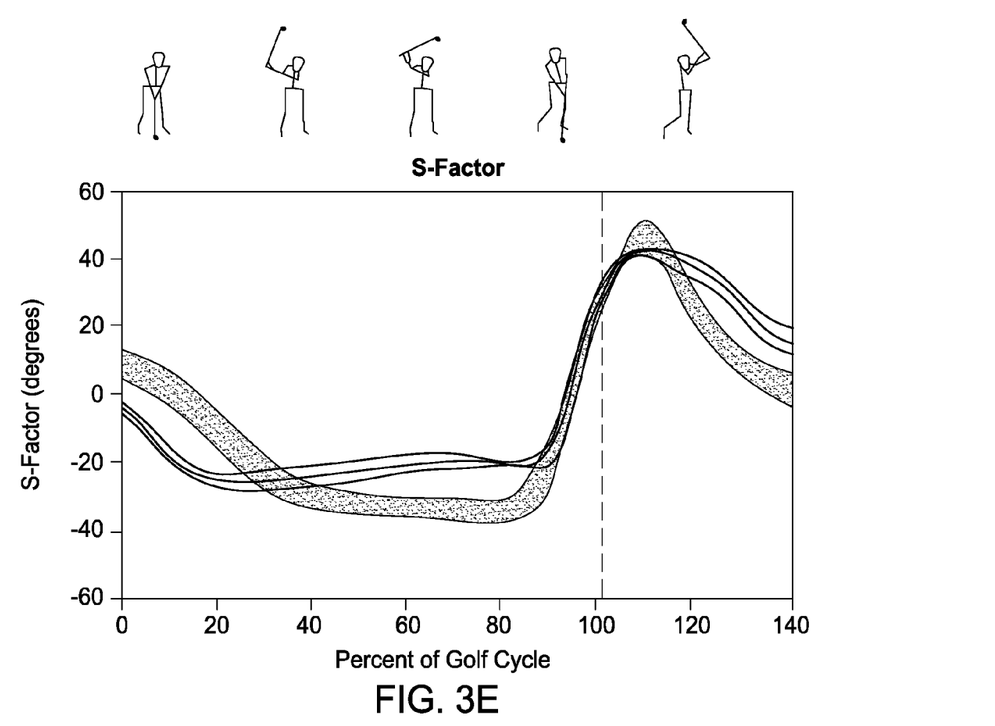
Figure 3F:
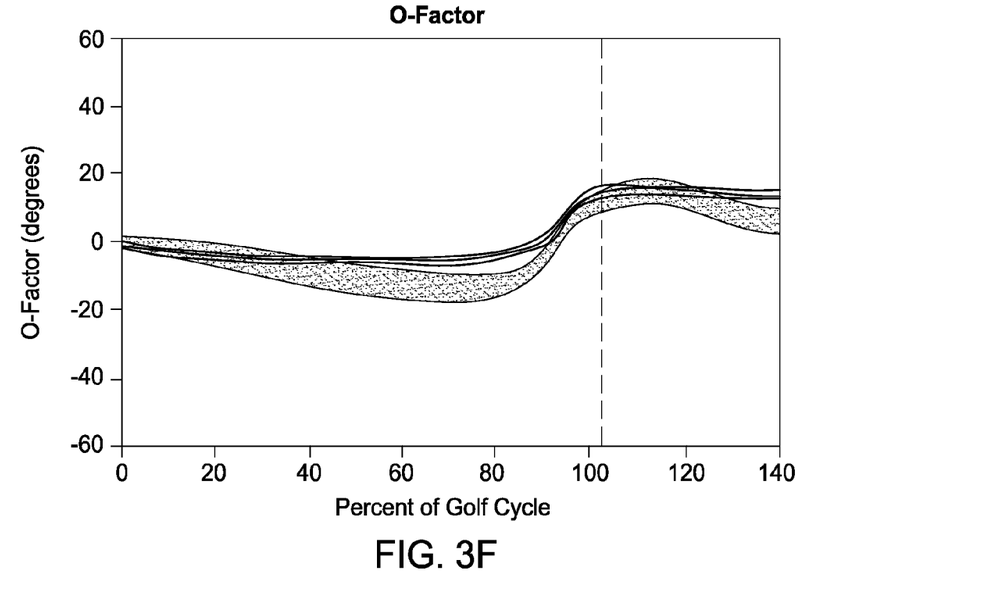
Figure 3G:
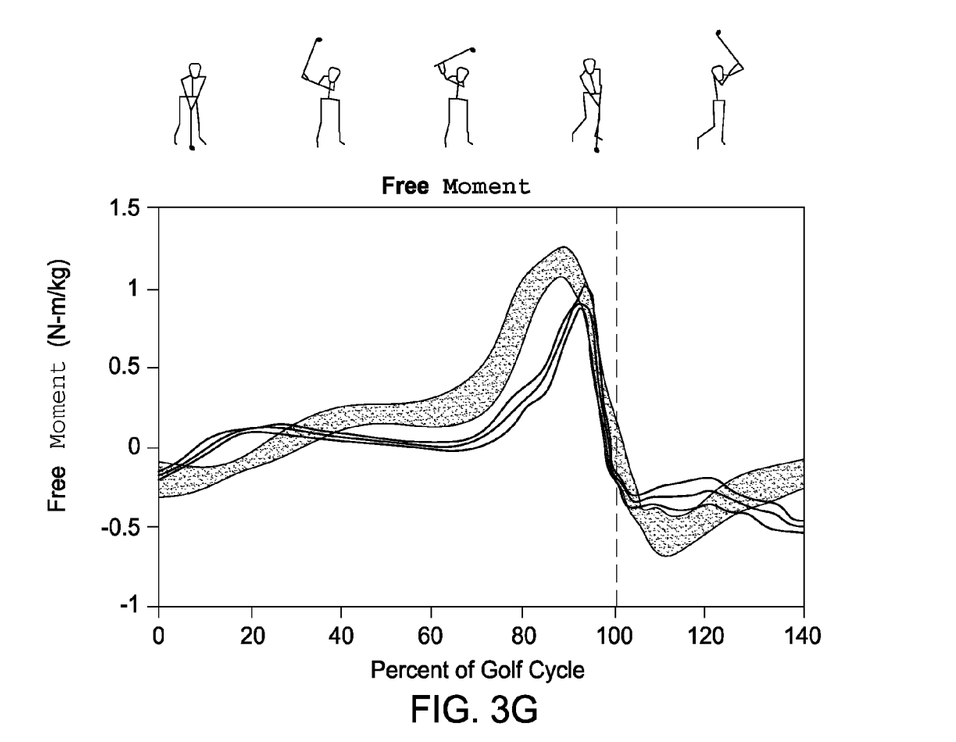
Figure 3H:
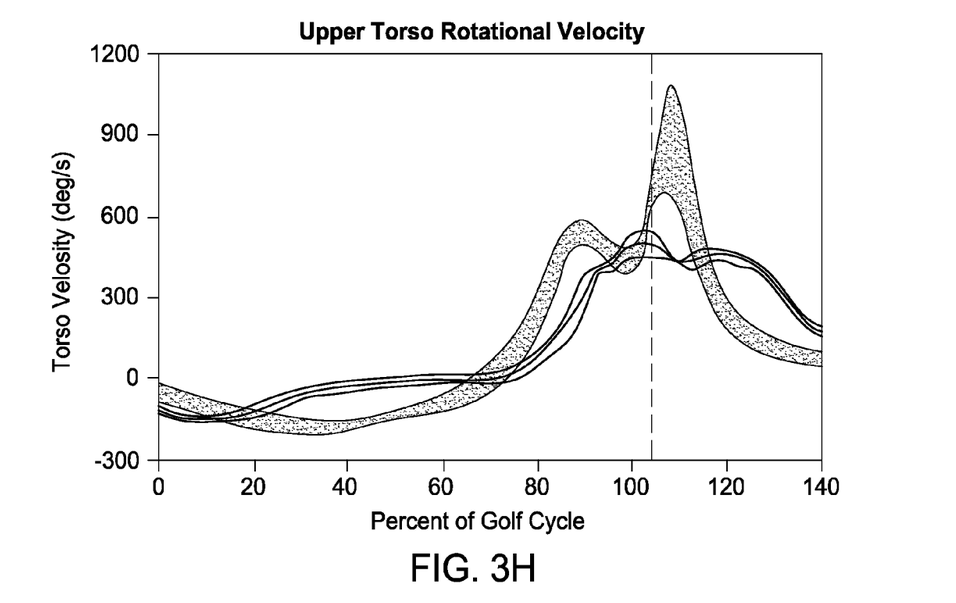
Figure 3I:
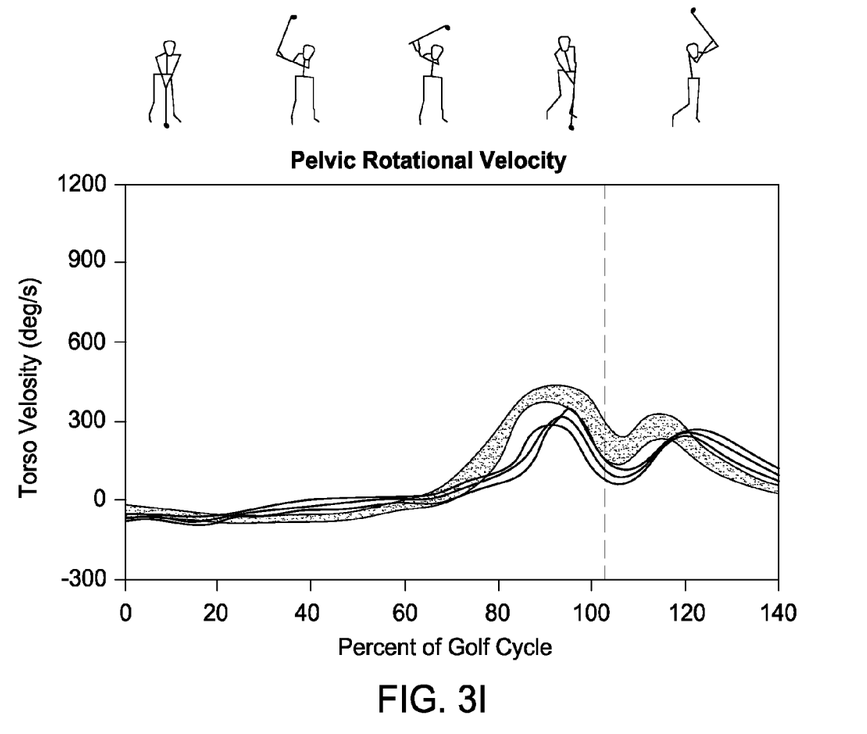

For the professional golfers, backswing began with a clockwise rotation of the pelvis and upper torso in the horizontal plane (FIG. 2a). Downswing was initiated by the reversal of pelvic rotation followed by a reversal of upper torso rotation (FIG. 2a). Peak free moment/kg occurred in early downswing (FIG. 2b).

Peak free moment/kg, peak X-factor, and peak S-factor were highly consistent among the professional golfers (Table 1) and were very strongly correlated to CSI within subjects (Table 2). Peak X-factor occurred just prior to peak free moment in all swings (FIG. 2b). Peak X-factor was more highly predictive of CSI than either peak upper torso rotation or peak pelvic rotation alone (Table 2). X-factor at impact was also highly correlated to CSI (Table 2). S-factor at impact was less predictive of CSI than peak S-factor (Table 2). O-factor at impact and peak O-factor were less consistent (Table 1) and not as predictive of CSI as peak free moment/kg, X-factor at impact, peak X-factor, and peak S-factor (Table 2).

All biomechanical parameters increased from easy to medium to hard swings among professional golfers (Table 3). Summary statistics indicated that there was a significant linear increase in clubhead speed at impact, peak free moment/kg, X-factor at impact, peak X-factor, peak upper torso rotation, peak S-factor, and O-factor at impact from easy to medium to hard swings.

As for amateurs versus professional golfers, the number of biomechanical factors during amateur hard swings that fell outside both one and two standard deviations of mean values for professional hard golf swings increased with handicap (Table 4). Benchmark curves of professional golfers are shown in FIG. 3 in comparison to hard swings of one amateur golfer with a handicap of 15. Impact occurs at 100% percent of the cycle. For professional golfers, the mean±1 S.D. for biomechanical parameters are shown throughout the duration of the golf swing and demonstrate a narrow range of values; however, kinematic and kinetic patterns of individual amateurs varied widely (data not shown). FIGS. 3A through 3I are graphs of golf swing rotational biomechanics for an amateur golfer compared to the average of the professional golfers, and Table 5 shows the average, standard deviation and percent professional of each of the parameters shown in the graphs of FIGS. 3A through 3G.

Thus, the sequence of key rotational biomechanics during the professional golf swing and their relationship to power generation was analyzed. Backswing began with a clockwise rotation of the pelvis and upper torso in the horizontal plane. Pelvic rotation reversed direction immediately before the beginning of downswing, and was followed by a reversal of upper torso rotation (FIG. 2a). Similarly, other studies have found that pelvic transition occurred prior to upper torso transition, serving to increase the X-factor during the early part of the downswing (Cheetham, et al., *The importance of stetching the X factor in the golf downswing* (Sep. 7-13, 2000, Paper presented at the International Congress on Sport Science, Brisbane, Australia). The pelvis continued to lead the upper torso throughout downswing. At impact, the upper torso was relatively parallel to the intended line of flight and rotated beyond the pelvis during follow-through (FIG. 2a).

Peak X-factor occurred just prior to peak free moment in all trials of the professional golfers (FIG. 2b) in late backswing or early downswing. This suggests that peak X-factor may contribute to peak free moment as indicated by the very strong within-subject correlations (Table 2). The peak values of X-factor, upper torso rotation, and pelvic rotation were highly consistent among golfers, and similar to previous studies (Adlington, Clinics in Sports Medicine, 15(1):9-26 (1996); Burden, et al., J. of Sports Medicine and Physical Fitness, 7(2):76-82 (1998); Grimshaw and Burden, Medicine and Science in Sports and Exercise, 32(1):1617-73 (2000); Lemak, et al., Science and Golf II: Proceedings of the World Scientific Congress of Golf, pp. 14-19 (1994); Lephart, et al., J. of Strength and Conditioning Research, 21(3):860-69 (2007); McLean, Golf, 34(12):28 (1992); McLean and Andrisani, The X-Factor Swing, Harper Collins (1997); McTeigue, et al., Science and Golf II: Proceedings of the World Scientific Congress of Golf, pp. 50-58 (1994); Wheat, et al., J. of Sports Sciences, 25(7):749-55 (2007); Zheng, et al., International J. of Sports, 29(12):965-70 (2008)).

Also correlative was S-factor, or shoulder obliquity, as was O-factor, or pelvic obliquity, during the golf swing. Peak S-factor occurred right after impact and was found to be highly consistent (Cv=8.4%) among professional golfers. Peak O-factor occurred immediately after impact and was found to be consistent (Cv=23.9%) among professional golfers, although not as highly consistent as S-factor. Given that peak X-factor was also highly consistent (Cv=7.4%), these findings demonstrate that that professional golf swings are highly consistent within the group (i.e., inter-golfer consistency).

Quantifiable differences between professional and amateur golfers emerged. As expected, the novices had more pronounced differences in biomechanical factors than experienced amateurs when compared to professionals (Table 4). Benchmark curves (FIG. 3) revealed differences in biomechanics between amateur and professional golfers that may provide a basis for strategic training. For example, the peak free moment of novice #1 was reduced and delayed compared to the professionals. His X-factor was excessive in early backswing, but insufficient in downswing compared to professionals. Novice #2 had a reduced X-factor throughout backswing and downswing.

A number of golf swing biomechanical factors exhibited a significant linear increase from easy to medium to hard swings, including clubhead speed at impact, peak free moment/kg, X-factor at impact, peak X-factor, peak upper torso rotation, O-factor at impact, and peak S-factor (Table 3). This suggests that these factors are essential to golf swing power generation and modulation of driving distance. However, for peak pelvic rotation, there was no significant linear increase from easy, medium, to hard swings (Table 3). This suggests that upper torso rotation may contribute to X-factor to a greater degree than pelvic rotation.

Previous studies have reported peak and impact clubhead speeds ranging from 33-57 m/s (Fradkin, et al., J. of Science and Medicine in Sport, 7(4):465-72 (2004); Hume, et al., Sports Medicine, 35(5):429-49 (2005)). Similarly, the CSI values of the professional golfers studied herein fall within this range. The values reported here are near the lower end of this range, which may be explained by two reasons. First, the marker used to determine clubhead speed was on the most distal portion of the shaft, adjacent to the clubhead. Marker placement on the clubhead may have resulted in a higher linear clubhead velocity. Second, many previous studies used drivers instead of a 5-iron, as in this study. Given a constant angular velocity, a longer club such as a driver, or more distal marker placement, would result in higher linear clubhead speeds.

A precise understanding of optimal rotational biomechanics during the golf swing may be used to guide swing modifications to help prevent or aid in the treatment of injury (Lemak, et al., Science and Golf II: Proceedings of the World Scientific Congress of Golf, pp. 14-19 (1994); Parziale, Am. J. of Physical Med. And Rehabilitation, 81(7):498-501 (2002); Parziale and Mallon, Physical Med. And Rehabilitation Clinics of No. America, 17(3):589-607 (2006); Wadsworth, Current Sports Medicine Reports, 6(6):362-65 (2007)). Previous studies have reported that poor golf swing mechanics are one of the leading causes of golf-related injuries, especially for the amateur player (McHardy, et al., Sports Medicine, 36(2):171-87 (2006); Theriault and Lachance, Sports Medicine, 26(1): 43-57 (1998)). Low back injuries are one of the most prevalent injuries in golf (McHardy, et al., Sports Medicine, 36(2):171-87 (2006)), and have been shown to be related to an excessive X-factor (Lindsay and Horton, J. of Sports Sciences, 20(8):599-605 (2002)). One case study found that a physical training program and coaching strategy designed to reduce the X-factor significantly improved low back pain (Grimshaw and Burden, Medicine and Science in Sports and Exercise, 32(1):1617-73 (2000)). For example, Novice #1 was identified as having an excessive X-factor during the early portion of backswing. Based on this information, recommendations for swing modification could be made to reduce X-factor, thereby minimizing low back strain and risk of injury.

In summary, rotational biomechanical factors, specifically peak free moment/kg, peak X-factor, peak upper torso rotation, and peak S-factor are highly consistent, highly correlated to CSI, and are essential to golf swing power generation among professional golfers. X-factor at impact was consistent and highly correlated to CSI. The O-factor was fairly consistent and correlated with CSI, though to a lesser extent. Benchmark curves revealed individual differences in biomechanics of amateur compared to professional golfers and provide a basis for strategic training and injury prevention.

TABLE 1

Coefficients of variation (Cv) for mean biomechanical parameters of easy, medium, and hard swings among ten professional golfers.

| Biomechanical Parameter | Easy % Cv | Medium % Cv | Hard % Cv |
| --- | --- | --- | --- |
| Clubhead Speed at Impact | 9.7 | 5.0 | 5.9 |
| Peak Free Moment/Mass | 18.2 | 11.3 | 6.8 |
| X-factor at Impact | 23.7 | 15.3 | 19.0 |
| Peak X-factor | 8.0 | 7.5 | 7.4 |
| Peak Upper Torso Rotation | 5.9 | 6.7 | 5.8 |
| Peak Pelvic Rotation | 13.0 | 13.3 | 12.4 |
| S-Factor at Impact | 13.3 | 12.4 | 12.4 |
| Peak S-Factor | 6.6 | 7.1 | 8.4 |
| O-Factor at Impact | 25.3 | 23.7 | 25.3 |
| Peak O-Factor | 20.9 | 21.3 | 23.9 |

TABLE 2

The relationship between rotational biomechanical parameters and clubhead speed at impact (CSI) within ten professional golfers.

| | Within Subjects | | |
| --- | --- | --- | --- |
| Correlation to CSI | Median Correlation Coefficient ($\rho$) | Mean Correlation Coefficient ± 1 S.D. ($\rho$) | Range |
| Peak Free Moment/kg | 0.943 | 0.914 ± 0.081 | 0.800-1.000 |
| X-factor at Impact | 0.943 | 0.863 ± 0.220 | 0.257-1.000 |
| Peak X-factor | 0.900 | 0.863 ± 0.134 | 0.543-1.000 |
| Peak Upper Torso Rotation | 0.900 | 0.692 ± 0.356 | 0.086-1.000 |
| Peak Pelvic Rotation | 0.572 | 0.354 ± 0.564 | −0.600-0.943 |
| S-Factor at Impact | 0.657 | 0.430 ± 0.544 | −0.679-0.900 |
| Peak S-Factor | 0.750 | 0.702 ± 0.284 | 0.154-1.000 |
| O-Factor at Impact | 0.635 | 0.420 ± 0.646 | −0.700-1.000 |
| Peak O-Factor | 0.600 | 0.312 ± 0.697 | −0.886-0.943 |

TABLE 3

Changes in biomechanical parameters for easy, medium, and hard swings among ten professional golfers.

| Biomechanical Parameter | Easy | Medium | Hard | Chi-Square | Friedman (P-value) | Wilcoxon ($\alpha = 0.05$) |
|---|---|---|---|---|---|---|
| Clubhead Speed at Impact (m/s) | 27.4 ± 2.6 | 31.6 ± 1.6 | 35.4 ± 2.1 | 20.0 | <0.001 | a, b, c |
| Peak Free moment (N · m/kg) | 0.83 ± 0.15 | 1.00 ± 0.11 | 1.19 ± 0.08 | 19.5 | <0.001 | a, b, c |
| X-factor at Impact (degrees) | 24 ± 6 | 28 ± 4 | 33 ± 6 | 18.2 | <0.001 | a, b, c |
| Peak X-factor (degrees) | 52 ± 4 | 54 ± 4 | 56 ± 4 | 18.2 | <0.001 | a, b, c |
| Peak Upper Torso Rotation (degrees) | 94 ± 6 | 97 ± 6 | 99 ± 6 | 11.4 | 0.003 | a, b |
| Peak Pelvic Rotation (degrees) | 44 ± 6 | 45 ± 6 | 46 ± 6 | 2.0 | 0.368 | — |
| S-Factor at Impact (degrees) | 24 ± 3 | 24 ± 3 | 25 ± 3 | 5.0 | 0.082 | a, c |
| Peak S-Factor (degrees) | 45 ± 3 | 46 ± 3 | 48 ± 4 | 12.8 | 0.002 | a, b, c |
| O-Factor at Impact (degrees) | 10 ± 3 | 11 ± 3 | 12 ± 3 | 9.7 | 0.008 | a, c |
| Peak O-Factor (degrees) | 15 ± 3 | 16 ± 3 | 16 ± 4 | 3.8 | 0.150 | b |

Summary statistics are included for Friedman ranks test differences (Chi-Square values shown for n = 10, df = 2, $\alpha = 0.05$) and significant Wilcoxon signed ranks test differences ($\alpha = 0.05$) for (a) easy vs. hard, (b) easy vs. medium, and (c) medium vs. hard swings.

TABLE 4

Summary of biomechanical factors among professional (mean values, n = 10) and five amateur (individual values, n = 5) golfers. The amateurs consisted of both players with a Handicap (Hcp) and Novice (Nov).

| Biomechanical Parameter | Pros | Hcp 4 | Hcp 15 | Hcp 30 | Nov #1 | Nov #2 |
|---|---|---|---|---|---|---|
| Clubhead Speed at Impact (m/s) | 35.4 ± 2.1 | 34.0 | 34.2 | 29.3** | 30.2** | 25.2** |
| Peak Free Moment/Mass (N · m/kg) | 1.19 ± 0.1 | 1.19 | 1.07* | 0.92** | 1.03** | 1.20 |
| X-factor at Impact (degrees) | 33 ± 6 | 33 | 23* | 23* | 25* | 1** |
| Peak X-factor (degrees) | 56 ± 4 | 52 | 54 | 48** | 46** | 46** |
| Peak Pelvic Rotation (degrees) | 46 ± 6 | 41 | 53* | 59** | 39* | 49 |
| Peak Upper Torso Rotation (degrees) | 99 ± 6 | 90* | 104 | 107* | 79** | 91* |
| S-Factor at Impact (degrees) | 25 ± 3 | 21* | 19** | 21* | 27 | 12** |
| Peak S-Factor (degrees) | 48 ± 4 | 47 | 42* | 50 | 42* | 33** |
| O-Factor at Impact (degrees) | 12 ± 3 | 18** | 5** | 3** | 15 | −7** |
| Peak O-Factor (degrees) | 16 ± 4 | 19 | 13 | 12* | 17 | 8** |

Parameters are within one standard deviation of professional mean, unless noted:
*Between one and two standard deviations of professional mean
**Greater than or equal to two standard deviations of professional mean

TABLE 5

Biomechanical parameters of professional golfers compared to one amateur golfer (handicap 15).

| Golf Swing Parameter | Average ± SD | Percent of Pro |
|---|---|---|
| Clubhead speed at impact | 30.1 ± 6.0 | 85% |
| X-factor at impact | 25.4 ± 0.4 | 77% |
| S-factor at impact | 27.2 ± 1.1 | 109% |
| O-factor at impact | 14.6 ± 0.9 | 122% |
| Torso Velocity | 484.1 ± 41.4 | 106% |
| Pelvic Velocity | 190.9 ± 46.4 | 66% |
| Peak X-factor | 45.6 ± 1.8 | 81% |
| Peak S-factor | 45.6 ± 1.8 | 95% |
| Peak O-factor | 17.1 ± 0.0 | 107% |
| Peak Torso rotation | 78.8 ± 0.9 | 80% |
| Peak Pelvic rotation | 39.2 ± 2.5 | 85% |
| Peak Torso velocity | 508.0 ± 48.8 | 55% |
| Peak Pelvic velocity | 311.8 ± 32.3 | 75% |

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents. Additionally, it is intended that such equivalents include both currently known equivalents and equivalents developed in the future, i.e., any elements developed that perform the same function, regardless of structure. The scope of the present invention, therefore, is not intended to be limited to the exemplary aspects shown and described herein. Rather, the scope and spirit of present invention is embodied by the appended claims. In the claims that follow, unless the term "means" is used, none of the features or elements recited therein should be construed as means-plus-function limitations pursuant to 35 U.S.C. §112, ¶16.

We claim:

1. A method for analyzing a golf swing, comprising: measuring movement of a subject performing a golf swing using sensor elements; communicating the movement measurements to a computer-based analysis system; and using the computer-based analysis system to calculate values for at least four of the following parameters: peak X-factor, X-factor at impact, peak S-factor, S-factor at impact, peak O-factor and O-factor at impact, wherein X-factor is the relative difference between the rotation of the hips and the shoulders.

2. The method of claim 1, wherein values are calculated for at least one of the following additional parameters: clubhead speed at impact, clubhead height, upper torso rotation at impact, upper torso rotational velocity at impact, pelvic rotation at impact, pelvic rotational velocity at impact, peak free moment/mass, peak upper torso rotation, peak upper torso rotational velocity, peak pelvic rotation, and peak pelvic rotational velocity.

3. The method of claim 2, wherein values are calculated for at least three of clubhead speed at impact, peak free moment/mass, peak upper torso rotation, peak upper torso rotational velocity and peak pelvic rotation.

4. The method of claim 1, wherein values are calculated for at least five of the parameters.

5. The method of claim 4, wherein values are calculated for at least one of the following additional parameters: clubhead speed at impact, peak free moment/mass, peak upper torso rotation, peak upper torso rotational velocity and peak pelvic rotation.

6. The method of claim 5, wherein values are calculated for at least three of clubhead speed at impact, peak free moment/mass, peak upper torso rotation, peak upper torso rotational velocity and peak pelvic rotation.

7. The method of claim 1, wherein values are calculated for at least six of the parameters.

8. The method of claim 7, wherein values are calculated for at least one of the following additional parameters: clubhead speed at impact, clubhead height, upper torso rotation at impact, upper torso rotational velocity at impact, pelvic rotation at impact, pelvic rotational velocity at impact, peak free moment/mass, peak upper torso rotation, peak upper torso rotational velocity, peak pelvic rotation, and peak pelvic rotational velocity.

9. The method of claim 8, wherein values are calculated for at least three of clubhead speed at impact, peak free moment/mass, peak upper torso rotation, peak upper torso rotational velocity and peak pelvic rotation.

10. A method for analyzing and improving a subject's golf swing comprising:
measuring movement of a subject performing a golf swing using sensor elements;
communicating the movement measurements to a computer-based analysis system;
using the computer-based analysis system to calculate values for at least four of the following parameters: peak X-factor, X-factor at impact, peak S-factor, S-factor at impact, peak O-factor and O-factor at impact, wherein X-factor is the relative difference between the rotation of the hips and the shoulders and
using the computer-based analysis system to compare the values of the measured parameters to target values for the parameters.

11. The method of claim 10, wherein values are calculated and compared to target values for at least one of the following additional parameters: clubhead speed at impact, clubhead height, upper torso rotation at impact, upper torso rotational velocity at impact, pelvic rotation at impact, pelvic rotational velocity at impact, peak free moment/mass, peak upper torso rotation, peak upper torso rotational velocity, peak pelvic rotation, and peak pelvic rotational velocity.

12. The method of claim 11, wherein values are calculated and compared to target values for at least three of clubhead speed at impact, peak free moment/mass, peak upper torso rotation, peak upper torso rotational velocity and peak pelvic rotation.

13. The method of claim 12, wherein values are calculated and compared to target values for all of clubhead speed at impact, peak free moment/mass, peak upper torso rotation, peak upper torso rotational velocity and peak pelvic rotation.

14. The method of claim 10, wherein values are calculated and compared to target values for at least five of the parameters.

15. The method of claim 14, wherein values are calculated and compared to target values for at least one of the following additional parameters: clubhead speed at impact, peak free moment/mass, peak upper torso rotation, peak upper torso rotational velocity and peak pelvic rotation.

16. The method of claim 10, wherein values are calculated for at least six of the parameters.

17. The method of claim 16, wherein values are calculated and compared to target values for at least one of the following additional parameters: clubhead speed at impact, peak free moment/mass, peak upper torso rotation, peak upper torso rotational velocity and peak pelvic rotation.

18. The method of claim 17, wherein values are calculated and compared to target values for at least three of clubhead speed at impact, peak free moment/mass, peak upper torso rotation, peak upper torso rotational velocity and peak pelvic rotation.

19. The method of claim 18, wherein values are calculated and compared to target values for all of clubhead speed at impact, peak free moment/mass, peak upper torso rotation, peak upper torso rotational velocity and peak pelvic rotation.

20. A method for analyzing and improving a subject's golf swing comprising:
measuring movement of a subject performing a golf swing using sensor elements;
using the computer-based analysis system to calculate values for the following parameters: peak X-factor, X-factor at impact, peak S-factor, S-factor at impact, peak O-factor and O-factor at impact, clubhead speed at impact, peak free moment/mass, peak upper torso rotation, peak upper torso rotational velocity and peak pelvic rotation, wherein X-factor is the relative difference between the rotation of the hips and the shoulders; and
using the computer-based analysis system to compare the values of the measured parameters to target values for the parameters.

* * * * *